(12) United States Patent
Zhang et al.

(10) Patent No.: US 12,032,436 B2
(45) Date of Patent: Jul. 9, 2024

(54) BIOS ERROR LOCATING METHOD AND APPARATUS, DEVICE AND NON-VOLATILE STORAGE MEDIUM

(71) Applicant: INSPUR SUZHOU INTELLIGENT TECHNOLOGY CO., LTD., Jiangsu (CN)

(72) Inventors: Hongbo Zhang, Jiangsu (CN); Zhiyuan Xu, Jiangsu (CN); Bing Wang, Jiangsu (CN); Shaojun Yang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/256,806

(22) PCT Filed: Oct. 29, 2021

(86) PCT No.: PCT/CN2021/127324
§ 371 (c)(1),
(2) Date: Jun. 9, 2023

(87) PCT Pub. No.: WO2022/121548
PCT Pub. Date: Jun. 16, 2022

(65) Prior Publication Data
US 2023/0393926 A1     Dec. 7, 2023

(30) Foreign Application Priority Data
Dec. 11, 2020 (CN) .......................... 202011447497.3

(51) Int. Cl.
*G06F 11/07* (2006.01)
(52) U.S. Cl.
CPC ........ *G06F 11/079* (2013.01); *G06F 11/0745* (2013.01)

(58) Field of Classification Search
CPC .......................... G06F 11/079; G06F 11/0745
See application file for complete search history.

(56) References Cited

U.S. PATENT DOCUMENTS

2018/0217889 A1    8/2018  Bhutta et al.
2018/0321947 A1*  11/2018  Liu ..................... G06F 9/4401
(Continued)

FOREIGN PATENT DOCUMENTS

CN          109086155 A       12/2018
CN          111309506 A        6/2020
(Continued)

OTHER PUBLICATIONS

International search report for PCT/CN2021/127324 mailed on Feb. 9, 2022.
(Continued)

*Primary Examiner* — Jigar P Patel
(74) *Attorney, Agent, or Firm* — Dennemeyer & Associates LLC; Victoria Friedman

(57) ABSTRACT

A BIOS error locating method and apparatus, a device, and a storage medium are provided. The method includes: acquiring one or more MAP files which are generated during a compilation process of a BIOS and used for recording an entry address offset of each function; recording a base address of each function module after the BIOS is started, so as to obtain a base address log file; in response to occurrence of an EXCEPTION error during an execution process of the BIOS, executing an Exception handling function, so as to determine, according to the base address log file and the one or more MAP files, a target function that results in the EXCEPTION error; and recording a name of the target function in a serial log, and sending the serial log to a BMC.

17 Claims, 6 Drawing Sheets

(56) References Cited

U.S. PATENT DOCUMENTS

| | | | |
|---|---|---|---|
| 2019/0196575 A1* | 6/2019 | Grobelny | G06F 1/263 |
| 2020/0364339 A1* | 11/2020 | Chao | G06F 21/57 |
| 2021/0263868 A1* | 8/2021 | Maddukuri | G06F 11/0793 |
| 2021/0286692 A1* | 9/2021 | Chien | G06F 11/2284 |

FOREIGN PATENT DOCUMENTS

| | | |
|---|---|---|
| CN | 111737039 A | 10/2020 |
| CN | 111831466 A | 10/2020 |
| CN | 112463431 A | 3/2021 |

OTHER PUBLICATIONS

Search report for Chinese application No. 202011447497.3 filed on Dec. 11, 2020.

* cited by examiner

Fig. 4a

```
00: 0000000000000000, 00008, EfiBootServicesCode
01: 0000000000008000, 00037, EfiConventionalMemory
02: 000000000003F000, 00060, EfiBootServicesCode
03: 000000000009F000, 00001, EfiBootServicesData
04: 0000000000100000, 4E975, EfiConventionalMemory
05: 000000004EA75000, 00050, EfiBootServicesData
06: 000000004EAC5000, 00008, EfiConventionalMemory
07: 000000004EACD000, 039B2, EfiBootServicesData
08: 000000005247F000, 007BA, EfiConventionalMemory
09: 0000000052C39000, 00846, EfiBootServicesCode
10: 000000005347F000, 02000, EfiReservedMemoryType
11: 000000005547F000, 00500, EfiACPIReclaimMemory
12: 000000005597F000, 004A0, EfiACPIMemoryNvS
13: 0000000055E1F000, 04870, EfiRuntimeServicesDate
14: 000000005A68F000, 00340, EfiRuntimeServicesCode
15: 000000005A9CF000, 00101, EfiBootServicesData
16: 000000005AAD0000, 12530, EfiConventionalMemory
17: 000000006D000000, 00200, EfiBootServicesData
18: 000000006D200000, 001F1, EfiConventionalMemory
```

Fig. 4b

```
!!!! X64 Exception Type - 0D (#GP - General Protection)    CPU Apic ID – 00000000 !!!!
ExceptionData - 0000000000000000
RIP  _ 000000006D5001A7,   CS  _ 0000000000000038,   RELAGS _ 0000000000010203
RAX  _ 0000000000000004,   RCX _ 0074006F006F0042,   RDX  – 000000006D4F05B0
RBX  _ 0074006F006F002A,   RSP _ 000000006D4F0500,   RBP  _ 000000006D4F06C8
RSI  _ 000000006D514B68,   RDI _ 0074006F006F0042,
R8   _ 000000005A8E43C0.   R9  _ 0000000000000010,   R10  – 0000000000000000
R11  _ 000000006D4F04E0,   R12 _ 00000000000001E2,   R13  – 000000004D4F5E18
R14  _ 000000004C836FB8,   R15 _ 0000000050C04B18,
DS   _ 0000000000000030,   ES  _ 0000000000000030,   FS   _ 0000000000000030
GS   _ 0000000000000030    SS  _ 0000000000000030,
CR0  _ 0000000080010013    CR2 _ 0000000000000000,   CR3  _ 000000006D00100
CR4  _ 0000000000000668,   CR8 _ 0000000000000000
DR0  _ 0000000000000000,   DR1 _ 0000000000000000,   DR2  _ 0000000000000000
DR3  _ 0000000000000000,   DR6 _ 00000000FFFF0FF0,   DR7  _ 0000000000000400
GDTR– 000000005A36A618     0000000000000047,        IDTR _ 0000000000000000
IDTR – 0000000050D98018    0000000000000FFF,        TR   _ 0000000000000000
FXSAVE_STATE – 000000006D4F0160 |
```

Fig. 4c

| Address | Publics by Value | Rva+Base | Lib:Object |
|---|---|---|---|
| 0001:00000000 | SetJump | 0000000000000220 | BaseLib:SetJump.obi |
| 0001:000000d0 | InternalLongJump | 0000000000000390 | BaseLib:LongJump.obi |
| 0001:00000180 | InternalMemCopyMem | 0000000000000440 | BaseMemoryLibRepStr:CopyMem.obi |
| 0001:000001d0 | InternalMemZeroMem | 0000000000000490 | BaseMemoryLibRepStr:ZeroMem.obi |
| 0001:000001f0 | InternalMemSetMem | 00000000000004b0 | BaseMemoryLibRepStr:SetMem.obi |
| 0001:00000210 | InternalMemCompareMem | 00000000000004d0 | BaseMemoryLibRepStr:CompareMem.obi |
| 0001:00000230 | InternalMemSetMem64 | 00000000000004f0 | BaseMemoryLibRepStr:SetMem64.obi |
| 0001:00000250 | InternalMemSetMem32 | 0000000000000510 | BaseMemorvLibRepStr:SetMem32.obi |
| 0001:00000485 | CommonInterruptEntry | 0000000000000745 | DxeCouExceptionHandlerLib:ExceptionHandle |
| 0001:00000675 | AsmGetTemplateAddressMap | 0000000000000935 | DxeCpuExceptionHandlerLib:ExceptionHandle |
| 0001:00000813 | AsmVectorNumFixup | 0000000000000ad3 | DxeCouExceptionHandlerLib:ExceptionHandle |
| 0001:00000820 | CpuPause | 0000000000000ae0 | BaseLib:CouPause.obi |
| 0001:00000830 | AsmReadTsc | 0000000000000af0 | BaseLib:ReadTsc.obi |
| 0001:00000840 | Asmpbinvd | 0000000000000b00 | BaseLib:Wbinvd.obi |
| 0001:00000850 | AsmFlushCacheLine | 0000000000000b10 | BaseLib:FlushCacheLine.obi |
| 0001:00000860 | AsmTnyd | 0000000000000b20 | BaseLib:Invd.obi |
| 0001:00000870 | AsmCpuid | 0000000000000b30 | BaseLib:Cpuld.obi |
| 0001:000008a0 | AsmReadCs | 0000000000000b60 | BaseLib:ReadCs.obi |
| 0001:000008b0 | AsmnriteTr | 0000000000000b70 | BaseLib:WriteTr.obi |
| 0001:000008c0 | EnableInterrupts | 0000000000000b80 | BaseLib:EnableInterrupts.obi |
| 0001:000008d0 | DisableInterrupts | 0000000000000b90 | BaseLib:DisableInterrupts.obi |
| 0001:000008e0 | Internalx86ReadGdtr | 0000000000000ba0 | BaseLib:ReadGdtr.obi |
| 0001:000008f0 | InternalX86ReadIdtr | 0000000000000bb0 | BaseLib:ReadIdtr.obi |
| 0001:00000900 | Internalx86WriteIdtr | 0000000000000bc0 | BaseLib:WriteIdtr.obi |
| 0001:00000910 | InternalX86WriteGdtr | 0000000000000bd0 | BaseLib:WriteGdtr.obi |
| 0001:00000920 | AsmReadEflads | 0000000000000be0 | BaseLib:ReadEflags.obi |
| 0001:00000930 | InternalMemSetMem16 | 0000000000000bf0 | BaseMemoryLibRepStr:SetMem16.obi |
| 0001:00000950 | AsmCouidEx | 0000000000000c10 | BaseLib:CouldEx.obi |

Fig. 5

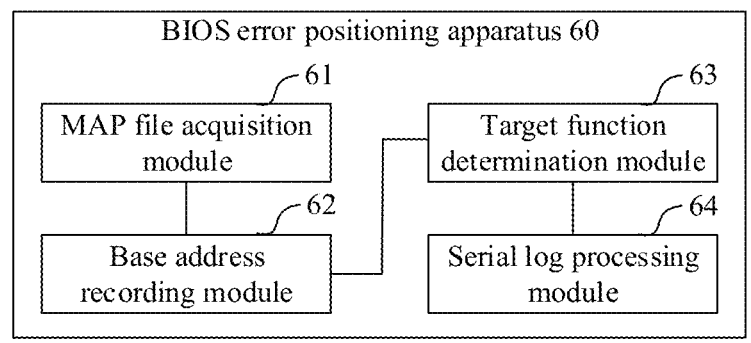

BIOS ERROR LOCATING METHOD AND APPARATUS, DEVICE AND NON-VOLATILE STORAGE MEDIUM

CROSS-REFERENCE TO RELATED APPLICATIONS

This is a 35 U.S.C. 371 National Stage Patent Application of International Application No. PCT/CN2021/127324, filed Oct. 29, 2021, which claims priority to Chinese application 202011447497.3, filed Dec. 11, 2020, each of which is hereby incorporated by reference in its entirety.

TECHNICAL FIELD

The present disclosure relates to the technical field of computers, and in particular to a Basic Input Output System (BIOS) error locating method and apparatus, a computer device and a non-volatile storage medium.

BACKGROUND

Nowadays, with the rapid development of server technologies, the requirements for ease of use, performance and functions of servers are continuously increased. Higher and higher requirements are raised for the handling capacity and efficiency of BIOS research and development personnel. During a BIOS research and development process, various problems such as ERROR/ASSERT/EXCEPTION may be encountered, and the BIOS research and development personnel are required to handle, locate and solve the problems.

During the process of solving the problems of the BIOS, the research and development personnel mainly analyze and locate the problems with the help of a Serial Log. Generally, when a crash occurs during a BIOS running process, the cause of the crash may be checked in the Serial Log of the BIOS. When error reporting information such as ERROR/ASSERT/EXCEPTION is found in the Serial Log, it means that there are some logical problems in the codes of the BIOS, and thus the research and development personnel need to locate and search for the cause of the problem, so as to solve the problem. At present, the error reporting information such as ERROR/ASSERT/EXCEPTION is automatically recorded in the Serial Log of the BIOS. When the error reporting information of ERROR/ASSERT is recorded, a specific function resulting in the error reporting is recorded at the same time, in addition, a C file where the function is located and a row number of the function in the C file will be clearly recorded. However, for the error reporting information EXCEPTION, there is no such recording mechanism.

The reason for such a difference in the recording mechanism is that the error reporting of ERROR/ASSERT is undoubtedly initiated by the corresponding ERROR/ASSERT functions, and the ERROR/ASSERT functions are fixed, therefore when the ERROR/ASSERT functions are implemented, it is only necessary to record and print the position where a called function body is located. With regard to the error reporting of EXCEPTION, the occurrence mechanism of EXCEPTION is different from that of ERROR/ASSERT, such that detailed information such as the function resulting in the error reporting, PROTOCOL and the like cannot be obtained. As a result, when the error reporting of EXCEPTION occurs, the locating process of the research and development personnel becomes very tedious. The lack of clear location information indicating where EXCEPTION occurs greatly increases the difficulty in locating and solving the problem, and greatly decreases the error locating efficiency.

SUMMARY

According to a first aspect of the present disclosure, a BIOS error locating method is provided, wherein the method includes:
  acquiring one or more MAP files which are generated during a compilation process of a BIOS and used for recording an entry address offset of each function;
  recording a base address of each function module after the BIOS is started, so as to obtain a base address log file;
  in response to occurrence of an EXCEPTION error during an execution process of the BIOS, executing an Exception handling function, so as to determine, according to the base address log file and the one or more MAP files, a target function that results in the EXCEPTION error; and
  recording a name of the target function in a serial log, and sending the serial log to a Baseboard Manager Controller (BMC).

In an embodiment, executing the Exception handling function, so as to determine, according to the base address log file and the one or more MAP files, the target function that results in the EXCEPTION error includes:
  acquiring and parsing EXCEPTION error information, so as to obtain a routing information protocol value;
  comparing the routing information protocol value with values in the base address column in the base address log file, so as to determine a target base address;
  determining a target entry address and a target MAP file according to the routing information protocol value and a preset Portable Executable (PE) specification;
  verifying the target MAP file by using the target base address and the target entry address; and in response to a verification result indicating that the target MAP file passes the verification, determining the target function and a name corresponding to the target function according to the routing information protocol value, the target base address and the target MAP file.

In an embodiment, comparing the routing information protocol value with the values in the base address column in the base address log file, so as to determine the target base address includes:
  using, as a reference base address, the first base address greater than the routing information protocol value among the values in the base address column in the base address log file; and
  acquiring, as the target base address, a previous base address of the reference base address in the base address log file.

In an embodiment, verifying the target MAP file by using the target base address and the target entry address includes:
  calculating a first difference value between the target entry address and the target base address;
  matching the first difference value with the entry address offset in the target MAP file; and
  in response to existence of a same value as the first difference value in the target MAP file, determining that the target MAP file passes the verification.

In an embodiment, determining the target function and a name corresponding to the target function according to the routing information protocol value, the target base address and the target MAP file includes:

calculating a second difference value between the routing information protocol value and the target base address;

using, as a reference entry offset address, the first value greater than the second difference value among values in an address column in the target MAP file; and using, as the target function, a function corresponding to a previous entry offset address of the reference entry offset address in the target MAP file, and reading the name corresponding to the target function.

In an embodiment, the method may further include:

in response to occurrence of an ERROR error and/or an ASSERT error during the execution process of the BIOS, recording, in the serial log, an ERROR function and/or an ASSERT function which results in the ERROR error and/or the ASSERT error.

In an embodiment, the method may further include:

acquiring the serial log from the BMC; and parsing the serial log to respectively determine functions which result in the EXCEPTION error, the ERROR error, and/or the ASSERT error.

According to a second aspect of the present disclosure, a BIOS error locating apparatus is further provided, wherein the apparatus includes:

a MAP file acquisition module, configured to acquire one or more MAP files which are generated during a compilation process of a BIOS and used for recording an entry address offset of each function;

a base address recording module, configured to record a base address of each function module after the BIOS is started, so as to obtain a base address log file;

a target function determination module configured to, in response to occurrence of an EXCEPTION error during an execution process of the BIOS, execute an Exception handling function, so as to determine, according to the base address log file and the one or more MAP files, a target function that results in the EXCEPTION error; and a serial log processing module, configured to record a name of the target function in a serial log, and send the serial log to a BMC.

According to a third aspect of the present disclosure, a computer device is further provided, wherein the computer device includes a memory and one or more processors, computer-readable instructions are stored in the memory, and when the computer-readable instructions are executed by the processor, the one or more processors execute the following operations:

acquiring one or more MAP files which are generated during a compilation process of a BIOS and used for recording an entry address offset of each function;

recording a base address of each function module after the BIOS is started, so as to obtain a base address log file;

in response to occurrence of an EXCEPTION error during an execution process of the BIOS, executing an Exception handling function, so as to determine, according to the base address log file and the one or more MAP files, a target function that results in the EXCEPTION error; and recording a name of the target function in a serial log, and sending the serial log to a BMC.

One or more non-volatile storage media storing computer-readable instructions, wherein the computer-readable instructions, when being executed by one or more processors, cause the one or more processors to execute the following operations:

acquiring one or more MAP files which are generated during a compilation process of a BIOS and used for recording an entry address offset of each function;

recording a base address of each function module after the BIOS is started, so as to obtain a base address log file;

in response to occurrence of an EXCEPTION error during an execution process of the BIOS, executing an Exception handling function, so as to determine, according to the base address log file and the one or more MAP files, a target function that results in the EXCEPTION error; and recording a name of the target function in a serial log, and sending the serial log to a BMC.

The details of one or more embodiments of the present disclosure are set forth in the following drawings and description. Other features and advantages of the present disclosure will become apparent from the specification, drawings and claims.

BRIEF DESCRIPTION OF THE DRAWINGS

In order to more clearly illustrate technical solutions in the embodiments of the present disclosure or the related art, a brief introduction on the drawings which are referenced in the description of the embodiments or the related art is given below. Apparently, the drawings in the description below are merely some of the embodiments of the present disclosure, based on which other drawings may be obtained by those having ordinary skill in the art without any creative effort.

FIG. 4a is a schematic diagram of file content of a base address log file (IB.log) provided in another embodiment of the present disclosure;

FIG. 4b is a schematic diagram of content of a certain piece of EXCEPTION error information provided in another embodiment of the present disclosure;

FIG. 4c is a schematic diagram of content of a certain MAP file provided in another embodiment of the present disclosure;

FIG. 5 is a schematic structural diagram of a BIOS error locating apparatus provided in another embodiment of the present disclosure.

DETAILED DESCRIPTION

In order to make the objectives, technical solutions and advantages of the present disclosure more clearly understood, the embodiments of the present disclosure are further described in detail below in combination with exemplary embodiments and with reference to the drawings.

It should be noted that, all expressions using "first" and "second" in the embodiments of the present disclosure are to distinguish two different entities with the same name or different parameters, therefore "first" and "second" are only for the convenience of expression, and should not be construed as limitations to the embodiments of the present disclosure, which will not be repeatedly illustrated in subsequent embodiments.

Figure 1:
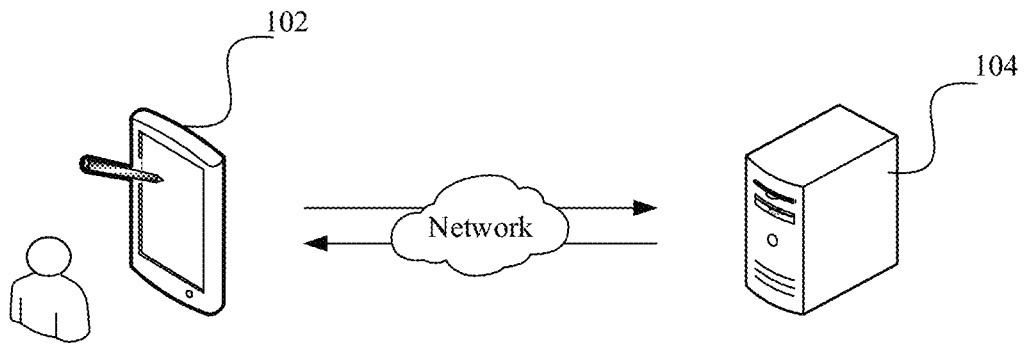
FIG. 1 is a diagram of an application scenario of a BIOS error locating method provided according to one or more embodiments of the present disclosure.

A BIOS error locating method provided in the embodiments of the present disclosure may be applied to an application environment shown in FIG. 1. A terminal 102 communicates with a server 104 through a network. The terminal 102 may be, but is not limited to, various personal computers, notebook computers, smart phones, tablet computers or portable wearable devices, and the server 104 may be implemented by using an independent server or a server cluster composed of a plurality of servers.

Figure 2:
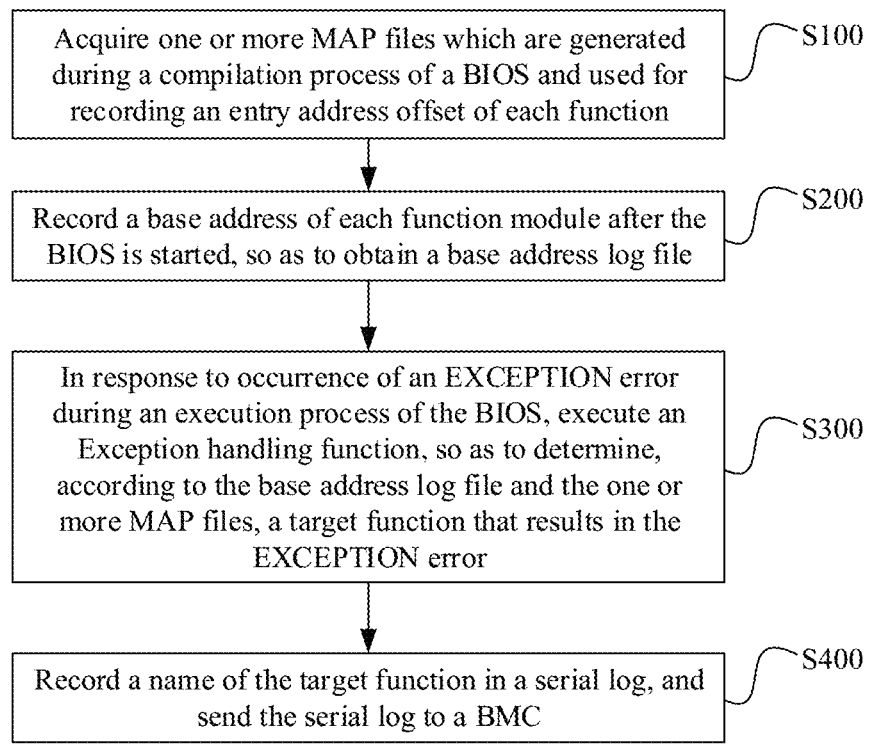
FIG. 2 is a schematic flowchart of a BIOS error locating method provided according to one or more embodiments of the present disclosure.

In an embodiment, please refer to FIG. 2, the embodiment of the present disclosure provides a BIOS error locating method, which is described taking the implementation of the method to the server in FIG. 1 as an example. As shown in FIG. 2, the method includes the following operations S100 to S400.

At S100, one or more MAP files which are generated during a compilation process of a BIOS and used for recording an entry address offset of each function are acquired. The MAP file is one of file formats, and the MAP file is a mapping file which is generated after compilation by compilation software and records all programs, data and Input/Output (IO) spaces used by a Digital Signal Processor (DSP). An entry address is denoted as EntryPoint, which refers to an address in a memory during execution of a function module.

At S200, a base address of each function module after the BIOS is started is recorded, so as to obtain a base address log file. The base address is an ImageBase, which is an address of a code after the code is loaded into a memory. When the BIOS is started, the ImageBase of each executed function module and the size of the ImageBase are recorded in a special log which has a file name of, for example, IB.log.

At S300, in response to occurrence of an EXCEPTION error during an execution process of the BIOS, an Exception handling function is executed so as to determine, according to the base address log file and the one or more MAP files, a target function that results in the EXCEPTION error.

At S400, a name of the target function is recorded in a serial log, and the serial log is sent to a BMC.

According to the BIOS error locating method, one or more MAP files which are generated during the compilation process of the BIOS and used for recording the entry address offset of each function are acquired, the base address of each function module after the BIOS is started is recorded so as to obtain the base address log file, when the EXCEPTION error occurs, the Exception handling function is executed to determine, according to the base address log file and the one or more MAP files, the target function that results in the EXCEPTION error, the name of the target function is recorded in the serial log, and the serial log is sent to the BMC. By virtue of the method, the function resulting in the EXCEPTION error is automatically analyzed and recorded, the efficiency of solving the EXCEPTION-type error may be improved, and the BIOS error locating time may be shortened.

In another embodiment, the operation S300 may include the following sub-operations S310 to S350.

At S310, EXCEPTION error information is acquired and parsed, so as to obtain a routing information protocol value, wherein the routing information protocol value is denoted as an RIP value.

At S320, the routing information protocol value is compared with values in a base address column in the base address log file, so as to determine a target base address.

At S330, a target entry address and a target MAP file are determined according to the routing information protocol value and a preset PE specification. Herein, PE refers to Portable Executable (i.e., a portable executable file), which is an executable format utilized by Microsoft. The preset PE specification refers to "Microsoft PE COFF Specification", and according to the specification for a PE Image in the preset PE specification, the PE Image may be parsed by an existing function, so as to obtain the EntryPoint of the function module and the MAP file name corresponding to the PE Image.

At S340, the target MAP file is verified by using the target base address and the target entry address.

At S350, in response to a verification result indicating that the target MAP file passes the verification, the target function and a name corresponding to the target function are determined according to the routing information protocol value, the target base address and the target MAP file.

In another embodiment, the foregoing operation S320 may include the following sub-operations S321 to S322.

At S321, the first base address greater than the routing information protocol value among the values in the base address column in the base address log file is used as a reference base address.

At S322, a previous base address of the reference base address in the base address log file is acquired as the target base address.

In yet another embodiment, the foregoing operation S340 may include the following sub-operations S341 to S343.

At S341, a first difference value between the target entry address and the target base address is calculated.

At S342, the first difference value is matched with the entry address offset in the target MAP file.

At S343, in response to existence of a same value as the first difference value in the target MAP file, it is determined that the target MAP file passes the verification.

In yet another embodiment, the foregoing operation S350 may include the following sub-operations S351 to S353.

At S351, a second difference value between the routing information protocol value and the target base address is calculated.

At S352, the first value greater than the second difference value among values in an address column in the target MAP file is used as a reference entry offset address.

At S353, a function corresponding to a previous entry offset address of the reference entry offset address in the target MAP file is used as the target function, and the name corresponding to the target function is read.

In another embodiment, the method may further include the following operation S510.

At S510, in response to occurrence of an ERROR error and/or an ASSERT error during the execution process of the BIOS, an ERROR function and/or an ASSERT function which results in the ERROR error and/or the ASSERT error is recorded in the serial log.

In some exemplary implementations, the method may further include the following operations S520 and S530.

At S520, the serial log is acquired from the BMC.

At S530, the serial log is parsed to respectively determine functions which result in the EXCEPTION error, the ERROR error, and/or the ASSERT error.

Figure 3:
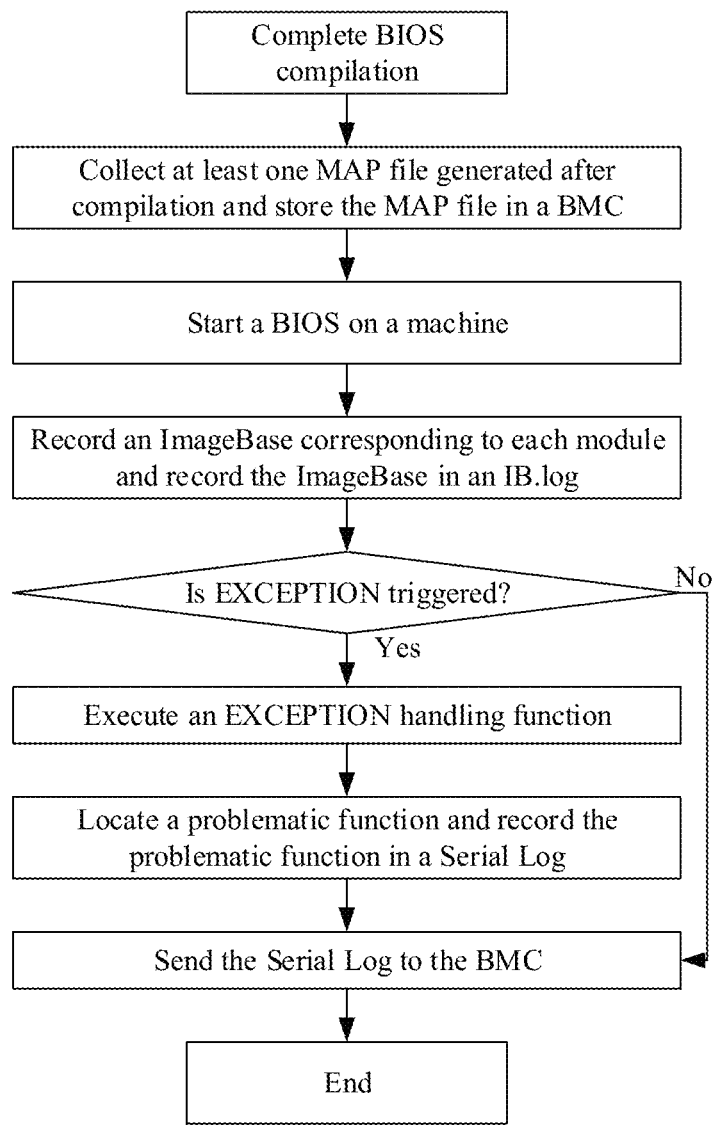
FIG. 3 is an overall implementation flowchart of a BIOS error locating method provided in another embodiment of the present disclosure.
Figure 4:
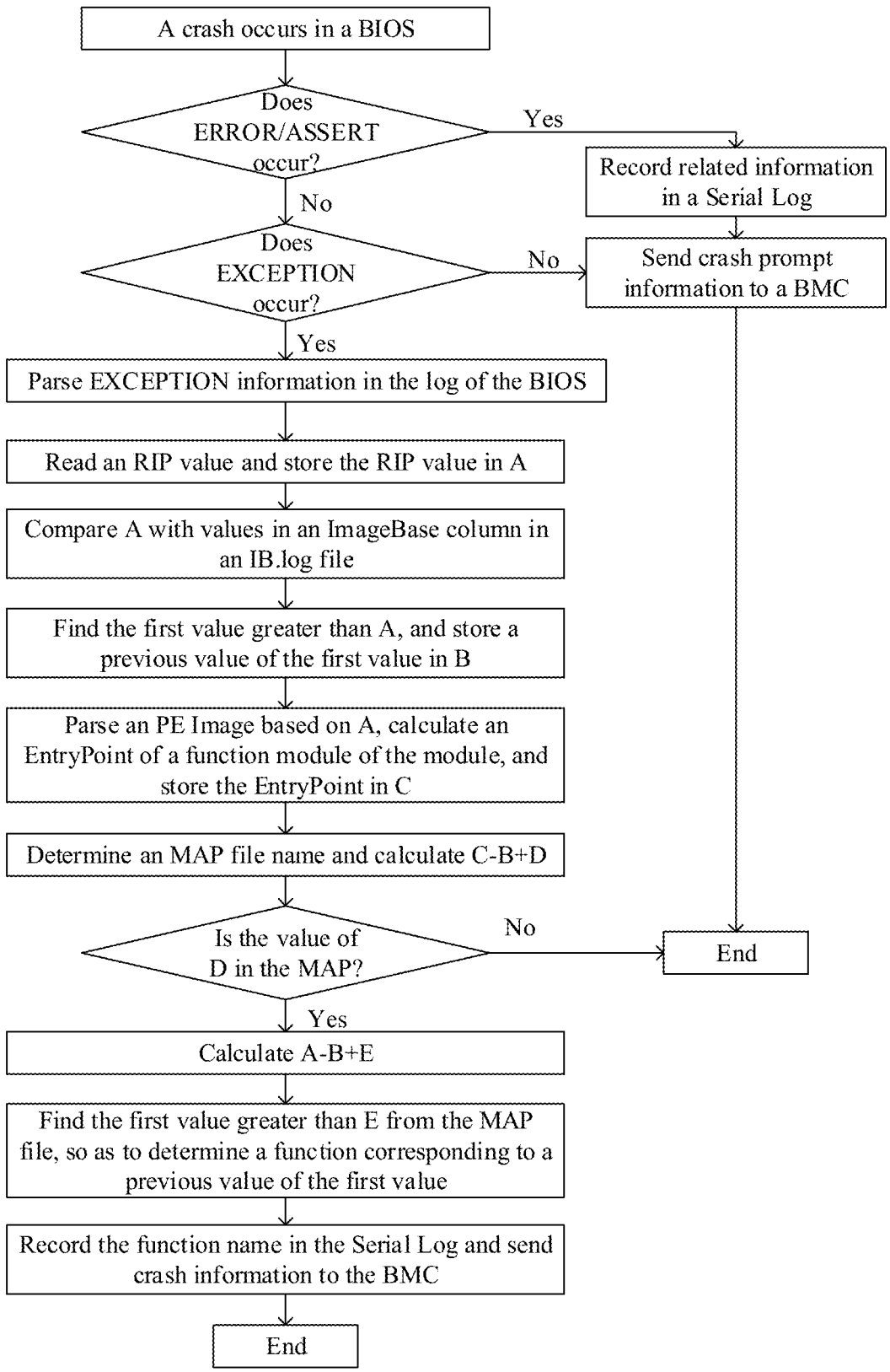
FIG. 4 is a schematic flowchart of executing an Exception handling function to determine a target function provided in yet another embodiment of the present disclosure.

In yet another embodiment, a server architecture of an Intel platform is taken as an example for illustration of the method. It should be noted that the method is not limited to be applied on the server of the Intel platform or a server system, and may also be applied on server systems of other platforms or other computer systems. As shown in FIG. 3 and FIG. 4, the BIOS error locating method may include the following exemplary implementation operations 1 to 6.

In operation 1, all MAP files which are generated during a compilation process of a BIOS and used for recording an entry location of each function relative to the present module are collected and stored in a BMC.

In operation 2, when the BIOS is started, a base address and a size of each executed module are recorded in a base address log file (for example, in a special log file having a file name of IB.log). For example, please refer to FIG. 4a, the IB.log file includes the following information from left to right: serial number, base address, module size and module name.

In operation 3, in response to occurrence of an EXCEPTION error during an execution process of the BIOS, an Exception handling function is executed. The process of executing the Exception handling function includes the following operations 31 to 37.

In operation 31, after a crash problem occurs in the BIOS, it is judged whether the crash is caused by occurrence of an EXCEPTION error.

In operation 32, when the crash is caused by the EXCEPTION error, EXCEPTION error information is parsed, and an RIP value in the EXCEPTION error information is stored in A. For example, FIG. 4b shows the EXCEPTION error information, which includes the RIP value corresponding to the EXCEPTION error.

In operation 33, the RIP value (i.e., the value in A, referred to as A value hereinafter) is compared with values in an Imagebase column in the IB.log file one by one, so as to find the first value greater than the RIP value, and a previous value of the found value is stored in B as a target base address.

In operation 34, according to the RIP value and based on settings of a PE Image in "Microsoft PE COFF Specification", the PE Image is parsed through an existing function, so as to find a target entry address of the function module and a target MAP file name corresponding to the PE Image, and the target entry address value is stored in C.

In operation 35, the target MAP file found in operation 34 is opened, an offset address of the EntryPoint relative to the ImageBase is calculated according to the target entry address value C− the target base address B, the offset address is denoted as a first difference value D, the first difference value D is compared with an EntryPoint offset in the target MAP file, when there is a same value as the first difference value in the target MAP file, it confirms that the target MAP file found in operation 34 is correct, and the next operation may be performed. Specific reference may be made to the content of a certain MAP file shown in FIG. 4c.

In operation 36, an offset value between the RIP value and the target base address B is calculated, the offset value is denoted as a second difference value, the second difference value is stored in E, the first value greater than the second difference value E is searched in an address column in the target MAP file, and a function corresponding to a previous value of the found value is the function that results in the EXCEPTION error.

In operation 37, the function name is recorded in a Serial Log, and crash information is sent to the BMC.

In operation 4, the execution results of operation 31 to operation 37 are recorded in the Serial Log of the BIOS.

In operation 5, the Serial Log is sent to the BMC and is stored by the BMC.

In operation 6, the Serial Log is extracted from the BMC for problem analysis.

According to the above BIOS error locating method, for the EXCEPTION error reporting, the function that results in the EXCEPTION error reporting is located and recorded according to the existing RIP information is combination with MAP information recorded in the BIOS execution process, thereby realizing automatic problem analysis and locating, improving the efficiency of solving the EXCEPTION error, and shortening the locating time of the BIOS error.

In yet another embodiment, please refer to FIG. 5, the present disclosure provides a BIOS error locating apparatus 60, wherein the apparatus includes:
 a MAP file acquisition module 61, configured to acquire one or more MAP files which are generated during a compilation process of a BIOS and used for recording an entry address offset of each function;
 a base address recording module 62, configured to record a base address of each function module after the BIOS is started, so as to obtain a base address log file;
 a target function determination module 63 configured to, in response to occurrence of an EXCEPTION error during an execution process of the BIOS, execute an Exception handling function, so as to determine, according to the base address log file and the one or more MAP files, a target function that results in the EXCEPTION error; and
 a serial log processing module 64, configured to record a name of the target function in a serial log, and send the serial log to a BMC.

It should be noted that, with regard to the specific definitions of the BIOS error locating apparatus, reference may be made to the definitions of the BIOS error locating method described above, and thus details are not described herein again. All or part of the modules in the above BIOS error locating apparatus may be implemented by software, hardware and a combination thereof. The above modules may be embedded into or independent of a processor in a computer device in the form of hardware, and may also be stored in a memory in the computer device in the form of software, so that the processor calls corresponding operations for executing the above modules.

Figure 6:
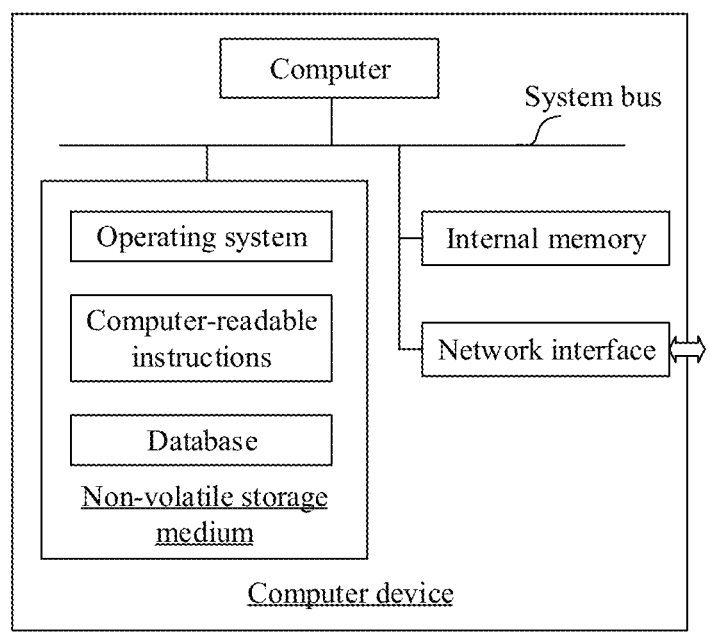
FIG. 6 is a block diagram of an internal structure of a computer device in another embodiment of the present disclosure.

According to another aspect of the embodiments of the present disclosure, a computer device is provided, the computer device may be a server, and an internal structure diagram thereof is shown in FIG. 6. The computer device includes a processor, a memory, a network interface and a database, which are connected by a system bus. The processor of the computer device is used for providing computing and control capabilities. The memory of the computer device includes a non-volatile storage medium and an internal memory. The non-volatile storage medium stores an operating system, a computer-readable instruction and a database. The internal memory provides an environment for the operation of the operating system and the computer-readable instruction in the non-volatile storage medium. The database of the computer device is used for storing data. The network interface of the computer device is used for communicating with an external terminal through a network connection. When executed by the processor, the computer-readable instruction implements the above BIOS error locating method.

The computer device includes a memory and one or more processors, wherein computer-readable instructions are stored in the memory, and when the computer-readable instructions are executed by the processor, the one or more processors execute the above method.

According to another aspect of the embodiments of the present disclosure, one or more non-volatile storage media storing computer-readable instructions are provided, wherein the computer-readable instructions, when being executed by one or more processors, cause the one or more processors to execute the above method. Those having ordinary skill in the art may understand that all or some processes in the methods in the foregoing embodiments may be implemented by computer-readable instructions instructing related hardware, and the computer-readable instructions may be stored in a non-volatile computer-readable storage medium, and when executed, the computer-readable instructions may include the processes of the embodiments of the foregoing methods. Any reference to the memory, the storage, the database or other media used in the embodiments provided in the present disclosure may include non-volatile and/or volatile memories.

The non-volatile memory may include a Read-Only Memory (ROM), a Programmable ROM (PROM), an Electrically Programmable ROM (EPROM), an Electrically Erasable Programmable ROM (EEPROM), or a flash memory. The volatile memory may include a Random Access Memory (RAM) or an external cache. By way of illustration and not limitation, the RAM may be available in various forms, such as a Static RAM (SRAM), a Dynamic RAM (DRAM), a Synchronous DRAM (SDRAM), a Dual-Data Rate SDRAM (DDRSDRAM), an Enhanced SDRAM (ESDRAM), a Synchlink DRAM (SLDRAM), a memory bus (Rambus) Direct RAM (RDRAM), a Direct memory bus (Rambus) Dynamic RAM (DRDRAM), and a memory bus (Rambus) Dynamic RAM (RDRAM), etc.

The technical features of the above embodiments may be combined arbitrarily, for the conciseness of description, not all possible combinations of the technical features in the above embodiments are not described, however, as long as there is no contradiction in the combinations of these technical features, these combinations should be considered as falling within the scope recorded in the present specification.

The above embodiments merely provide several embodiments of the present disclosure, and the description thereof is relatively specific and detailed, but cannot be understood as limitations to the patent scope of the present disclosure. It should be noted that, those having ordinary skill in the art may made several variations and improvements without departing from the concept of the present disclosure, and all these variations and improvements fall within the protection scope of the present disclosure. Therefore, the protection scope of the present disclosure shall be subject to the appended claims.

What is claimed is:

1. A Basic Input Output System (BIOS) error locating method, comprising:
    acquiring one or more MAP files which are generated during a compilation process of a BIOS and used for recording an entry address offset of each function;
    recording a base address of each function module after the BIOS is started, so as to obtain a base address log file;
    in response to occurrence of an EXCEPTION error during an execution process of the BIOS, executing an Exception handling function, so as to determine, according to the base address log file and the one or more MAP files, a target function that results in the EXCEPTION error, wherein executing the Exception handling function, so as to determine, according to the base address log file and the one or more MAP files, the target function that results in the EXCEPTION error comprises, acquiring and parsing EXCEPTION error information, so as to obtain a routing information protocol value; comparing the routing information protocol value with values in the base address column in the base address log file, so as to determine a target base address; determining a target entry address and a target MAP file according to the routing information protocol value and a preset Portable Executable (PE) specification; verifying the target MAP file by using the target base address and the target entry address, and in response to a verification result indicating that the target MAP file passes the verification, determining the target function and a name corresponding to the target function according to the routing information protocol value, the target base address and the target MAP file; and
    recording a name of the target function in a serial log, and sending the serial log to a Baseboard Manager Controller (BMC).

2. The method according to claim 1, wherein comparing the routing information protocol value with the values in the base address column in the base address log file, so as to determine the target base address comprises:
    using, as a reference base address, a first base address greater than the routing information protocol value among the values in the base address column in the base address log file; and
    acquiring, as the target base address, a previous base address of the reference base address in the base address log file.

3. The method according to claim 1, wherein verifying the target MAP file by using the target base address and the target entry address comprises:
    calculating a first difference value between the target entry address and the target base address;
    matching the first difference value with the entry address offset in the target MAP file; and
    in response to existence of a same value as the first difference value in the target MAP file, determining that the target MAP file passes the verification.

4. The method according to claim 1, wherein determining the target function and a name corresponding to the target function according to the routing information protocol value, the target base address and the target MAP file comprises:
    calculating a second difference value between the routing information protocol value and the target base address;
    using, as a reference entry offset address, a first value greater than the second difference value among values in an address column in the target MAP file; and
    using, as the target function, a function corresponding to a previous entry offset address of the reference entry offset address in the target MAP file, and reading the name corresponding to the target function.

5. The method according to claim 1, further comprising:
    in response to occurrence of an ERROR error and/or an ASSERT error during the execution process of the BIOS, recording, in the serial log, an ERROR function and/or an ASSERT function which results in the ERROR error and/or the ASSERT error.

6. The method according to claim 5, further comprising:
    acquiring the serial log from the BMC; and
    parsing the serial log to respectively determine functions which result in the EXCEPTION error, the ERROR error, and/or the ASSERT error.

7. The method according to claim 1, wherein the MAP file is a mapping file which is generated by compilation software during the compilation process of the BIOS and records programs, data and Input/Output (IO) spaces used by a Digital Signal Processor (DSP).

8. The method according to claim 1, wherein the base address is an address of a code after the code is loaded into a memory, and when the BIOS is started, the base address of each executed function module and a size of the base address are recorded in the base address log file.

9. The method according to claim 1, wherein determining the target entry address and the target MAP file according to the routing information protocol value and the preset PE specification comprises:
according to a specification for a PE Image in the preset PE specification, parsing the PE Image to obtain the target entry address of the function module and a name of the target MAP file corresponding to the PE Image.

10. A computer device, comprising a memory and one or more processors, wherein computer-readable instructions are stored in the memory, and when the computer-readable instructions are executed by the one or more processors, the one or more processors execute following operations for Basic Input Output System (BIOS) error locating:
acquiring one or more MAP files which are generated during a compilation process of a BIOS and used for recording an entry address offset of each function;
recording a base address of each function module after the BIOS is started, so as to obtain a base address log file;
in response to occurrence of an EXCEPTION error during an execution process of the BIOS, executing an Exception handling function, so as to determine, according to the base address log file and the one or more MAP files, a target function that results in the EXCEPTION error, wherein executing the Exception handling function, so as to determine, according to the base address log file and the one or more MAP files, the target function that results in the EXCEPTION error comprises, acquiring and parsing EXCEPTION error information, so as to obtain a routing information protocol value; comparing the routing information protocol value with values in the base address column in the base address log file, so as to determine a target base address; determining a target entry address and a target MAP file according to the routing information protocol value and a preset Portable Executable (PE) specification; verifying the target MAP file by using the target base address and the target entry address, and in response to a verification result indicating that the target MAP file passes the verification, determining the target function and a name corresponding to the target function according to the routing information protocol value, the target base address and the target MAP file; and
recording a name of the target function in a serial log, and sending the serial log to a Baseboard Manager Controller (BMC).

11. The computer device according to claim 10, wherein comparing the routing information protocol value with the values in the base address column in the base address log file, so as to determine the target base address comprises:
using, as a reference base address, a first base address greater than the routing information protocol value among the values in the base address column in the base address log file; and
acquiring, as the target base address, a previous base address of the reference base address in the base address log file.

12. The computer device according to claim 10, wherein verifying the target MAP file by using the target base address and the target entry address comprises:
calculating a first difference value between the target entry address and the target base address;
matching the first difference value with the entry address offset in the target MAP file; and
in response to existence of a same value as the first difference value in the target MAP file, determining that the target MAP file passes the verification.

13. The computer device according to claim 10, wherein determining the target function and a name corresponding to the target function according to the routing information protocol value, the target base address and the target MAP file comprises:
calculating a second difference value between the routing information protocol value and the target base address;
using, as a reference entry offset address, a first value greater than the second difference value among values in an address column in the target MAP file; and
using, as the target function, a function corresponding to a previous entry offset address of the reference entry offset address in the target MAP file, and reading the name corresponding to the target function.

14. The computer device according to claim 10, wherein when the computer-readable instructions are executed by the one or more processors, the one or more processors further execute following operation:
in response to occurrence of an ERROR error and/or an ASSERT error during the execution process of the BIOS, recording, in the serial log, an ERROR function and/or an ASSERT function which results in the ERROR error and/or the ASSERT error.

15. The computer device according to claim 14, wherein when the computer-readable instructions are executed by the one or more processors, the one or more processors further execute following operations:
acquiring the serial log from the BMC; and
parsing the serial log to respectively determine functions which result in the EXCEPTION error, the ERROR error, and/or the ASSERT error.

16. The computer device according to claim 10, wherein determining the target entry address and the target MAP file according to the routing information protocol value and the preset PE specification comprises:
according to a specification for a PE Image in the preset PE specification, parsing the PE Image to obtain the target entry address of the function module and a name of the target MAP file corresponding to the PE Image.

17. One or more non-transitory non-volatile computer-readable storage media storing computer-readable instructions, wherein the computer-readable instructions, when being executed by one or more processors, cause the one or more processors to execute following operations for Basic Input Output System (BIOS) error locating:
acquiring one or more MAP files which are generated during a compilation process of a BIOS and used for recording an entry address offset of each function;
recording a base address of each function module after the BIOS is started, so as to obtain a base address log file;
in response to occurrence of an EXCEPTION error during an execution process of the BIOS, executing an Exception handling function, so as to determine, according to the base address log file and the one or more MAP files, a target function that results in the EXCEPTION error, wherein executing the Exception handling function, so as to determine, according to the base address log file and the one or more MAP files, the target function that results in the EXCEPTION error comprises: acquiring and parsing EXCEPTION error information, so as to obtain a routing information protocol value: comparing the routing information protocol value with values in the base address column in the base address log file, so as to determine a target base address; determining a target entry address and a target MAP file according to the routing information protocol value and a preset Portable Executable (PE) specification; verifying the target MAP file by using the target base address and the target entry address, and in response to a verification result indicating that the target MAP file passes the verification, determining the target function and a name corresponding to the target function according to the routing information protocol value, the target base address and the target MAP file; and recording a name of the target function in a serial log, and sending the serial log to a Baseboard Manager Controller (BMC).

* * * * *